April 13, 1943.   P. A. RAICHE   2,316,715
APPARATUS FOR MANUFACTURING TUBING
Filed Feb. 20, 1939   2 Sheets-Sheet 2
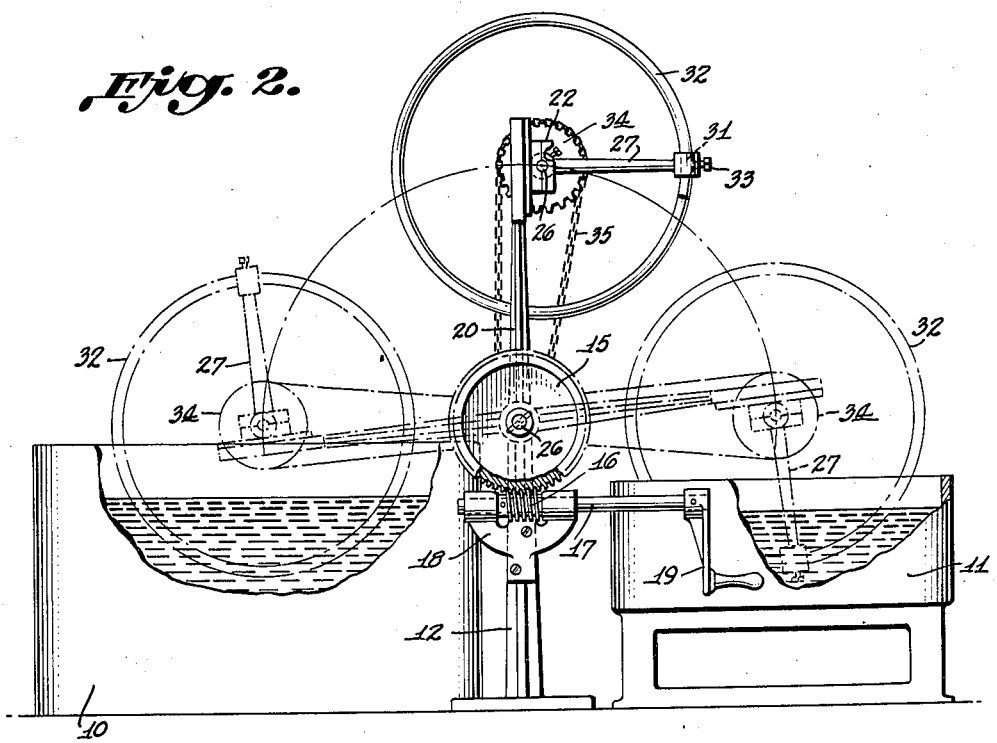
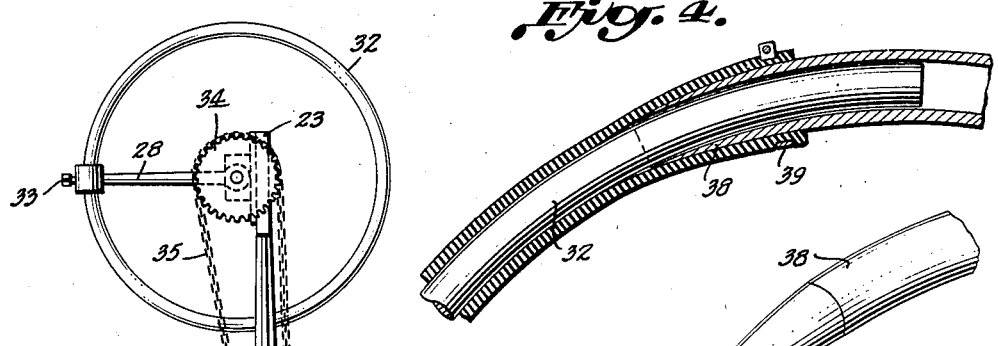
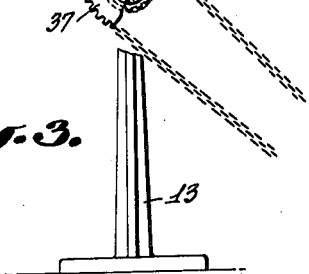
Inventor:
PAUL A. RAICHE
By Nathaniel Frucht
Attorney Patented Apr. 13, 1943

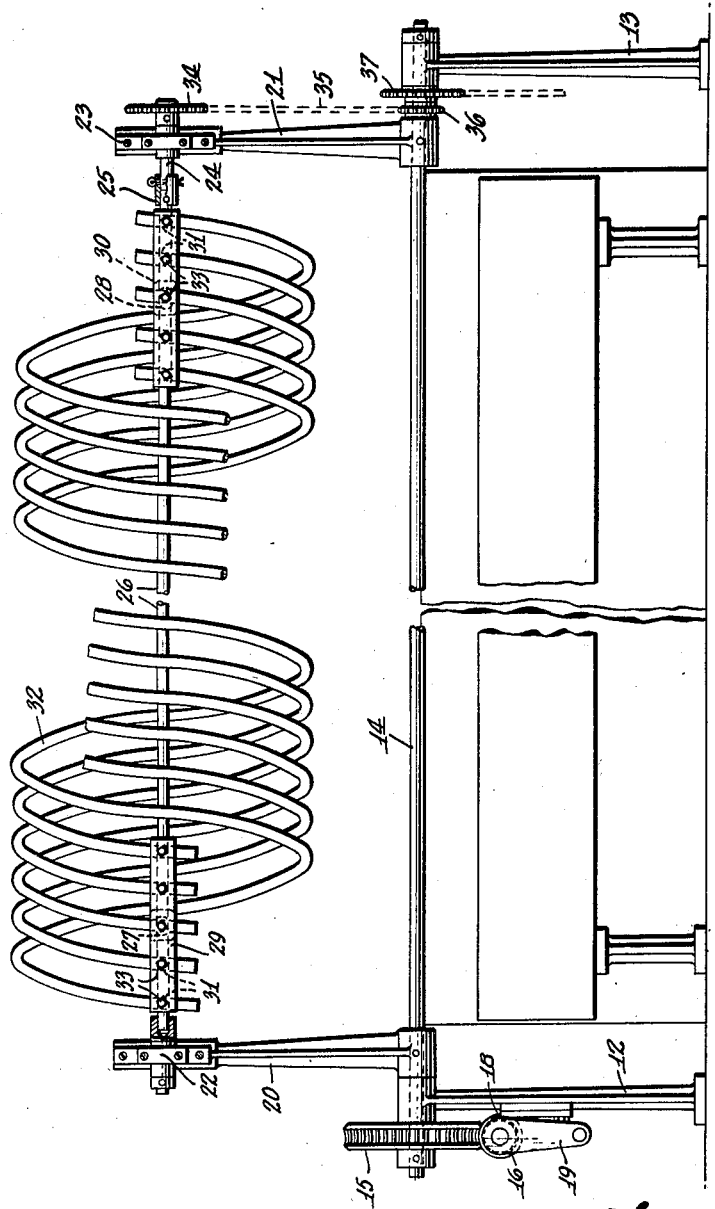

2,316,715

UNITED STATES PATENT OFFICE 2,316,715

APPARATUS FOR MANUFACTURING TUBING

Paul A. Raiche, Providence, R. I., assignor to Davol Rubber Company, a corporation of Rhode Island Application February 20, 1939, Serial No. 257,311

4 Claims. (Cl. 18—24)

My present invention relates to the manufacturing of rubber articles, and has particular reference to the manufacture of rubber tubing.

Rubber tubing is at present manufactured by extrusion, or is hand made. The extrusion method forces plastic rubber over a central mandrel, and has the advantage that long lengths of tubing may be made, but it has been found difficult to obtain a uniform bore, and the surface of the tubing is rough. Moreover, the extruded tubing must be coiled and vulcanized in coils, and the completed tubing is thus given a spiral set.

Hand made tubing is made from sheets, the longitudinal edges being welded together. This mode of construction is difficult to apply to thick walled tubing of small bore, as the seam tends to open. It is, moreover, difficult to obtain a smooth, uniform bore.

It has been proposed to overcome these disadvantages by forming the tubing on vertical rods which are dipped into a long tank containing latex or rubber cement, the rods then being dipped into an acid tank for coagulating the rubber, and the process being repeated by reversing the rods for alternate dippings, in order to build up the rubber tubing. This process is disadvantageous because the completed tubing has a tendency to be thicker at the end portions, and because the tanks and materials are bulky and costly; moreover, the process is slow and necessitates constant supervision.

I have therefore devised an apparatus for forming rubber tubing, which may be made in long lengths, with absolutely uniform bore, and with a smooth surface, the tubing being integral and without seams. My novel apparatus thus produces a better product, and in addition, reduces manufacturing expense in that the space required is smaller and the labor required is less.

With the above and other objects and advantageous features in view, the invention consists of a novel arrangement of parts more fully disclosed in the detailed description following, in conjunction with the accompanying drawings, and more specifically defined in the claims appended thereto.

In the drawings:

Fig. 1 is a side elevation, partly broken away, of the novel tube forming apparatus;

Fig. 2 is a left side elevation of Fig. 1, parts being broken away to better disclose the construction;

Fig. 3 is a fragmentary right side elevation of Fig. 1;

Fig. 4 is a sectional detail showing the stripping arrangement; and

Fig. 5 is a perspective view of the preferred stripper nozzle.

Referring to the drawings, the novel apparatus includes a tank 10 for holding latex or rubber cement, and a tank 11 adjacent the first tank and having an acid coagulant therein. Two vertical bearing standards 12, 13 are positioned between the tanks, and have a shaft 14 rotatably mounted therein, this shaft being rotated by means of a worm gear 15 keyed thereon, the worm gear meshing with a worm drive 16 on a cross shaft 17 which is supported in an X type bearing 18 secured to the standard 12. The cross shaft 17, as shown, is adapted to be manually rotated by a crank 19 secured thereto, but may be mechanically rotated as hereinafter described.

Two arms 20, 21 are pinned or otherwise keyed to the shaft 14, adjacent the ends thereof, to rotate therewith, the arm 20 having a bearing socket 22 at the end thereof, and the arm 21 having a bearing 23 at the end thereof to receive a rotatable stub shaft 24; a bayonet type socket 25 is keyed to the stub shaft 24, and cooperates with the bearing socket 22 to releasably receive a support shaft 26.

Two brackets 27, 28 are secured to the ends of the support shaft 26, and have lateral rods 29, 30 extending parallel to the support shaft, these rods having a plurality of transverse openings 31 to detachably receive the ends of a series of helical coils 32, the coil ends being locked in the rods by any suitable means, such as set screws 33. The helical coils are preferably of aluminum.

Referring now to Figs. 1 and 3, the stub shaft 24 has a gear 34 keyed thereon, which is connected by means of a chain 35 to a gear set 36, 37 rotatably mounted on the shaft 14, the gear 37 being chain driven by any suitable power mechanism.

The operation of the improved apparatus may now be explained:

The operator turns the handle 19 to bring the coils into the tank 10, the coils rotating at a slow speed and having a coat of latex or rubber cement deposited thereon; the handle is then turned to bring the coils out of the tank 10, for drying, the rotation of the coils during the drying operation smoothing the deposited coat and facilitating drying; the coils are then turned into the tank 11 to coagulate the deposited coat and are then again dried. The process is repeated until a tubing of sufficient wall thickness is formed; then the shaft 26 and the coils are removed, subjected to vulcanization, and the tubing is stripped from the coils.

The preferred manner of stripping is to utilize liquid pressure, as by means of a water nozzle 38, see Fig. 5, which has a tapered end and is slid under the tubing at one end of a coil, as shown in Fig. 4, the tubing end being clamped as by a clamp 39 or by holding it by the fingers until the water has flowed through; the tubing then winds itself off the coil.

The above described method thus provides a smooth tubing of any suitable length, with an absolutely uniform bore; the apparatus required is of small dimensions, easily operated, and one operator may attend to a plurality of forming apparatus each capable of forming a plurality of rubber tubes.

The use of a helical carrier as described has been found desirable in coating small articles, as the helical immersion in the latex or rubber cement and the coagulant impacts an even coat, and the rotation of the carrier facilitates even drying. The small articles may be fixed to the coil, or may have free hanging movement, as found most suitable.

The latex or rubber cement is preferably continuously stirred and screened, to prevent coagulation and ensure a suitable bath for coating.

If desired, the movements of the shaft 14 and therefore of the coils, may be mechanically performed, instead of manually, by using a standard type construction of cams or Geneva movements; moreover, in certain installations, a series of tanks may be utilized and the coils moved in conveyors to obtain the desired plural coats.

While I have described a specific constructional embodiment of my invention, it is obvious that desired changes in the arrangement and the proportion of the parts may be made to suit the requirements for different installations, within the spirit and the scope of the invention as defined in the appended claims.

I claim:

1. In a machine for manufacturing rubber tubing by dipping, a dipping core comprising a helical form detachably mounted on a horizontal axial support, vertical arms carrying said support, said arms being rotatably mounted on standards, means for rotating said arms in said standards, and additional means for rotating said axial support in said arms whereby said core may be turned to alternately dip into a coating compound tank and a coagulant solution tank, and said form may be rotated during said dipping operation.

2. In a machine for manufacturing rubber tubing by dipping, a dipping core comprising a helical form detachably mounted on a horizontal axial support, vertical arms carrying said support, said arms being rotatably mounted on standards, means comprising manually operable gearing for rotating said arms in said standards, and additional means operatively connected to said gearing for rotating said axial support in said arms, whereby said core may be turned to alternately dip into a coating compound tank and a coagulant solution tank, and said form may be rotated during said dipping operation.

3. In a machine for manufacturing rubber tubing by dipping, a dipping core comprising a helical form detachably mounted on a horizontal axial support, vertical arms carrying said support, said arms being rotatably mounted on standards, means for rotating said arms in said standards, and additional means for rotating said axial support in sad arms, said support being removable from said arms, whereby said core may be turned to alternately dip into a coating compound tank and a coagulant solution tank, and said form may be rotated during said dipping operation.

4. In a machine for manufacturing rubber tubing by dipping, a dipping core comprising a helical form detachably mounted on a horizontal axial support, vertical arms carying said support, said arms being rotatably mounted on standards, means comprising manually operable gearing for rotating said arms in said standards, and additional means operatively connected to said gearing for rotating said axial support in said arms, said support being removable from said arms, whereby said core may be turned to alternately dip into a coating compound tank and a coagulant solution tank, and said form may be rotated during said dipping operation.

PAUL A. RAICHE.